(12) United States Patent
Rao et al.

(10) Patent No.: US 11,204,647 B2
(45) Date of Patent: Dec. 21, 2021

(54) SYSTEM AND METHOD FOR RADAR GESTURE RECOGNITION

(71) Applicant: TEXAS INSTRUMENTS INCORPORATED, Dallas, TX (US)

(72) Inventors: Sandeep Rao, Karnataka (IN); Sachin Bharadwaj, Karnataka (IN); Piyali Goswami, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 343 days.

(21) Appl. No.: 15/952,453

(22) Filed: Apr. 13, 2018

(65) Prior Publication Data

US 2019/0087009 A1  Mar. 21, 2019

(30) Foreign Application Priority Data

Sep. 19, 2017  (IN) .............................. 201741033157

(51) Int. Cl.
| | |
|---|---|
| G06F 3/01 | (2006.01) |
| G06F 3/16 | (2006.01) |
| G01S 7/35 | (2006.01) |
| G01S 7/41 | (2006.01) |
| G01S 13/58 | (2006.01) |
| G01S 13/34 | (2006.01) |

(52) U.S. Cl.
CPC .............. *G06F 3/017* (2013.01); *G01S 7/352* (2013.01); *G01S 7/41* (2013.01); *G01S 7/415* (2013.01); *G01S 13/343* (2013.01); *G01S 13/583* (2013.01); *G01S 13/584* (2013.01); *G06F 3/165* (2013.01); *G06F 3/167* (2013.01); *G01S 7/356* (2021.05); *G01S 7/417* (2013.01)

(58) Field of Classification Search
None
See application file for complete search history.

(56) References Cited

U.S. PATENT DOCUMENTS

| | | | |
|---|---|---|---|
| 9,314,648 B2 | 4/2016 | Li et al. | |
| 9,817,109 B2 | 11/2017 | Saboo et al. | |
| 2016/0252607 A1* | 9/2016 | Saboo | ...................... G01S 7/415 342/107 |
| 2016/0357262 A1* | 12/2016 | Ansari | ............... G06Q 10/0833 |
| 2020/0191943 A1* | 6/2020 | Wu | ........................ G01S 13/003 |
| 2020/0300972 A1* | 9/2020 | Wang | .................... A61B 5/7207 |

FOREIGN PATENT DOCUMENTS

| | | |
|---|---|---|
| WO | 2012/153227 A1 | 11/2012 |
| WO | 2015/022358 A1 | 2/2015 |

* cited by examiner

*Primary Examiner* — Whitney Moore
(74) *Attorney, Agent, or Firm* — Brian D. Graham; Charles A. Brill; Frank D. Cimino

(57) ABSTRACT

A method for gesture recognition includes receiving, by a processor, a first digital intermediate frequency (IF) signal stream from a first receive antenna and receiving, by the processor, a second digital IF signal stream from a second receive antenna. The method also includes computing, by the processor, a weighted Doppler metric stream based on the first digital IF signal stream and the second digital IF signal stream and computing, by the processor, an angle metric stream based on the first digital IF signal stream and the second digital IF signal stream. Additionally, the method includes computing, by the processor, a correlation between the weighted Doppler metric stream and the angle metric stream, to generate a first correlation and recognizing, by the processor, a gesture, based on the first correlation.

20 Claims, 12 Drawing Sheets

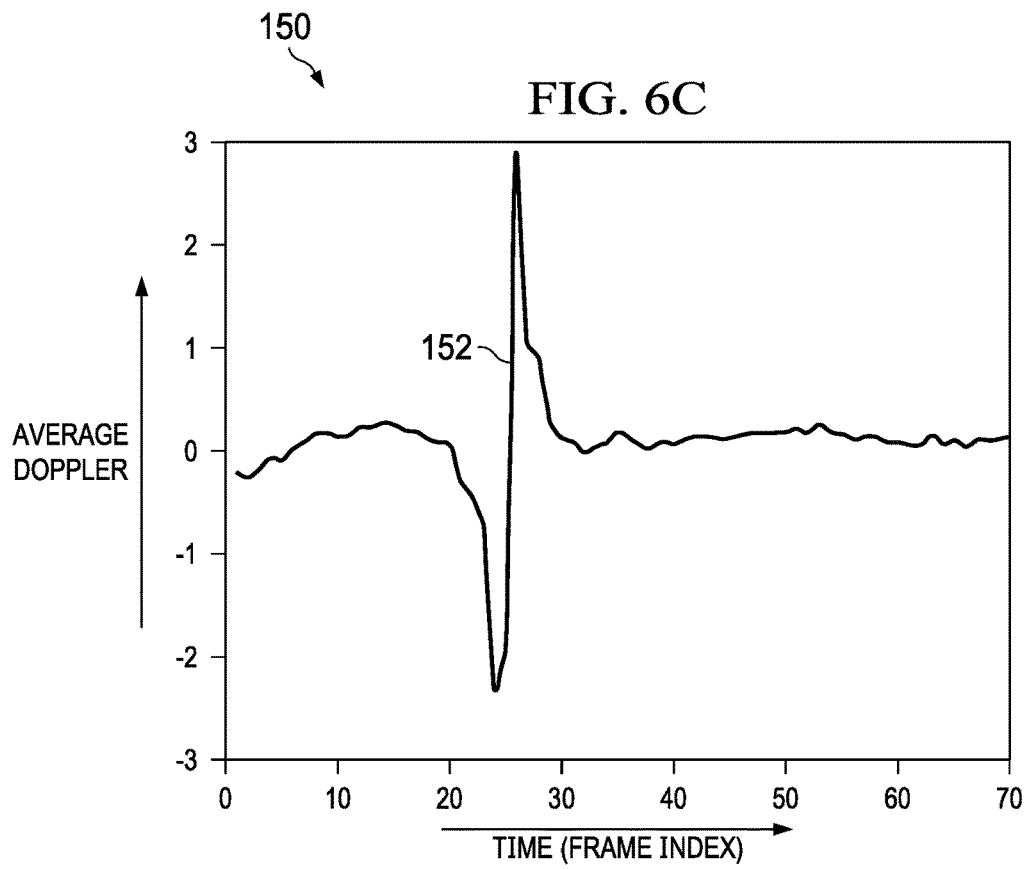
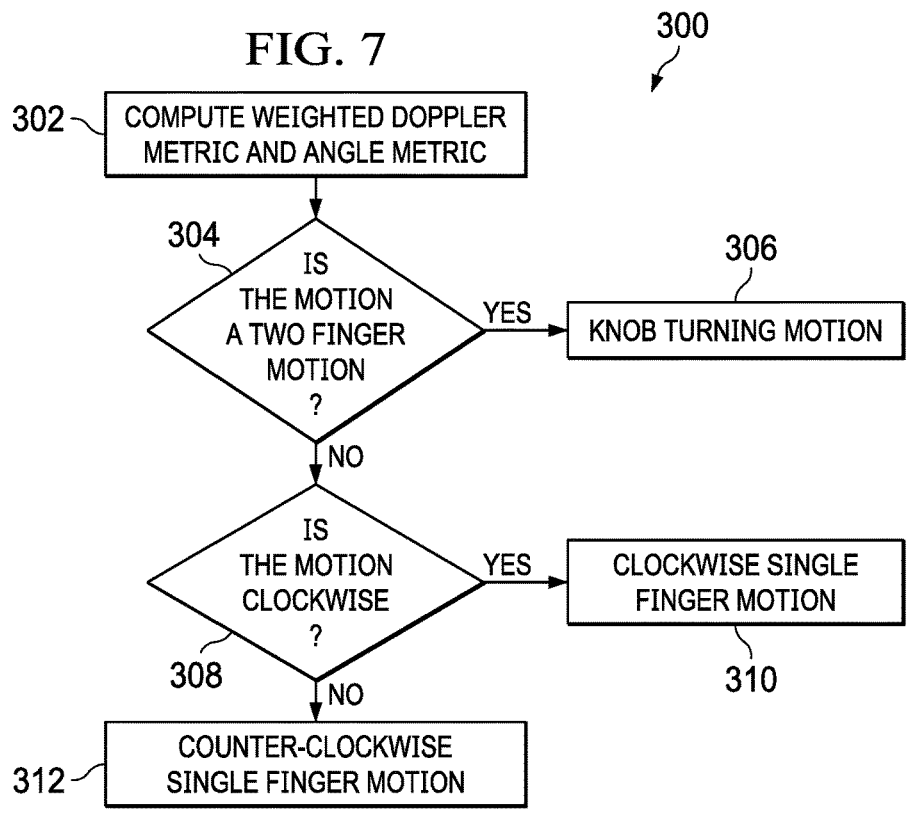

SYSTEM AND METHOD FOR RADAR GESTURE RECOGNITION

CROSS-REFERENCE TO RELATED APPLICATION

This application claims priority to India Patent Application No. 201741033157, filed on Sep. 19, 2017, and entitled "Technique for Gesture Recognition Using FMCW Radar," which application is hereby incorporated herein by reference in its entirety.

TECHNICAL FIELD

The present application relates in general to radar systems, and, in particular, to a system and method for radar gesture recognition.

BACKGROUND

Gesture recognition has many potential applications. For example, gesture recognition may be used to control audio and video devices, medical devices, robots, and consumer electronic devices, such as smart phones tablets, and gaming consoles. Gesture recognition may be incorporated into vehicle user interfaces.

SUMMARY

An embodiment method for gesture recognition includes receiving, by a processor, a first digital intermediate frequency (IF) signal stream from a first receive antenna and receiving, by the processor, a second digital IF signal stream from a second receive antenna. The method also includes computing, by the processor, a weighted Doppler metric stream based on the first digital IF signal stream and the second digital IF signal stream and computing, by the processor, an angle metric stream based on the first digital IF signal stream and the second digital IF signal stream. Additionally, the method includes computing, by the processor, a correlation between the weighted Doppler metric stream and the angle metric stream, to generate a first correlation and recognizing, by the processor, a gesture, based on the first correlation.

An embodiment method for gesture recognition includes receiving, by a processor, a digital intermediate frequency (IF) signal stream from a receive antenna and computing, by the processor, a weighted positive Doppler metric stream based on the digital IF signal stream. The method also includes computing, by the processor, a weighted negative Doppler metric stream based on the digital IF signal stream and computing, by the processor, a correlation between the weighted positive Doppler metric stream and the weighted negative Doppler metric stream. Additionally, the method includes recognizing, by the processor, a gesture, based on the correlation.

An embodiment frequency modulated continuous wave (FMCW) radar system includes a first receive antenna configured to receive a first received signal and a first receive channel coupled to the first receive antenna, the first receive channel configured to generate a first digital intermediate frequency (IF) signal based on the first received signal. The FMCW radar system also includes a second receive antenna configured to receive a second received signal and a second receive channel coupled to the first receive antenna, the second receive channel configured to generate a second digital IF signal based on the second received signal. Additionally, the FMCW radar system includes a processor coupled to the first receive channel and to the second receive channel. The processor is configured to compute a weighted Doppler metric stream based on the first digital IF signal stream and the second IF digital signal stream and compute an angle metric stream based on the first digital IF signal stream and the second digital IF signal stream. The processor is also configured to compute a correlation between the weighted Doppler metric stream and the angle metric stream, to generate a correlation and recognize a gesture based on the correlation.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIGS. 6A-C illustrate an embodiment wave gesture;

FIG. 7 illustrates a flowchart of an embodiment method of radar gesture recognition;

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
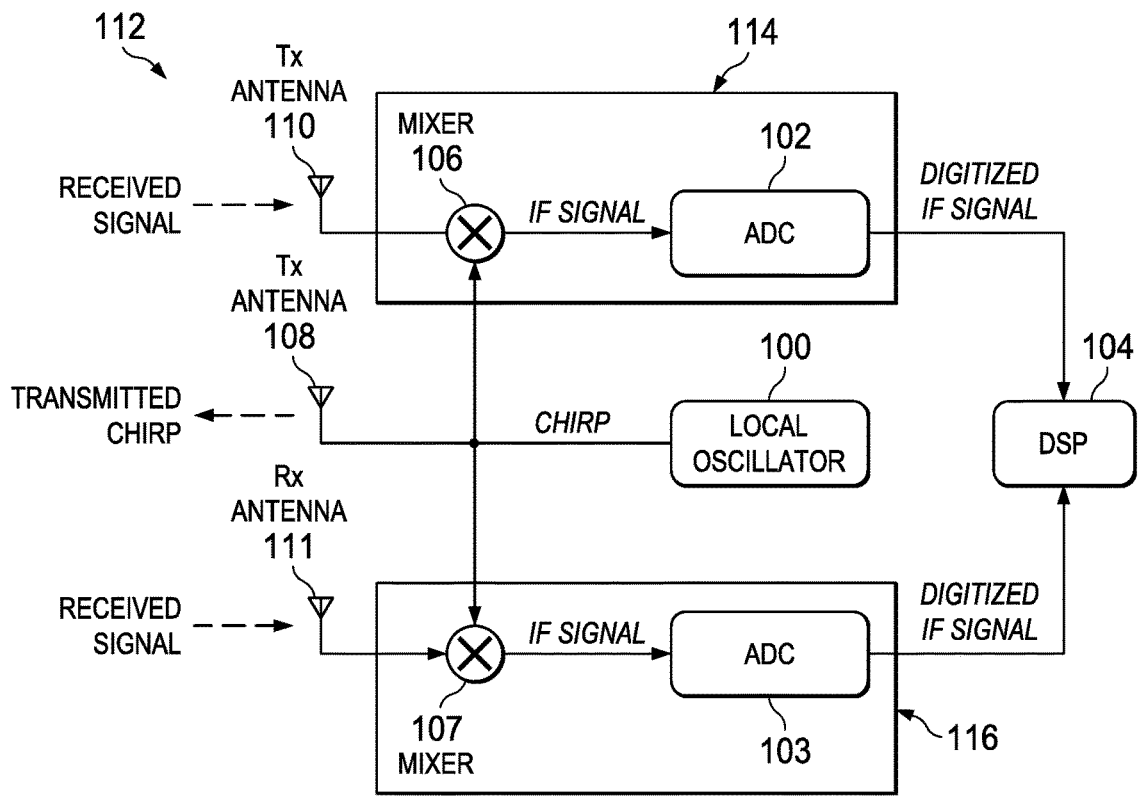
FIG. 1 illustrates an embodiment frequency modulated continuous wave (FMCW) radar system.

A variety of techniques may be used for gesture recognition, including computer vision, ultra-sonic sensing, electric field sensing, and inertial sensing. In some embodiments, pulsed radar with high angle resolution is used for gesture recognition.

Automotive applications are increasingly including radar. Gesture recognition is useful for automotive applications, for example to control navigation and infotainment systems and for gesture based door, trunk gas tank, or hood opening. In some embodiments, radar based gesture recognition may adjust the automotive environment, for example opening or closing windows, locking or unlocking doors, turning on or off child-proof locks, increasing or decreasing the temperature, or activating or deactivating heated or cooled seats. In some embodiments, radar based gesture recognition may adjust the driver configuration, for example adjust the driver's seat, adjust passenger seats, or adjust mirror angles. Radar based gesture recognition may be used to control navigational equipment, for example to zoom in or zoom out on a map. In an entertainment system, radar based gesture recognition may be used to increase or decrease volume, switch audio tracks, or cycle between audio options. In an embodiment, radar based gesture detection is used to adjust a clock. Radar based gesture recognition may be useful in industrial settings, such as a shop floor. Additionally, radar is increasingly useful for other applications, for example in mobile devices, such as mobile phones, tablets, and other user equipments (UEs). Radar based gesture recognition may be used to make a phone call, or transmit or receive information.

Radar is independent of ambient light and weather equipment. Additionally, radar sensors may be invisible to users, because radar can see through plastic, and may, for example, be placed inside the body of a vehicle. Radar is well suited for measuring range and velocity, which may limit false alarms. However, radar has limited angle resolution. In some situations, for example in some automotive or industrial applications, radar is present for other purposes, and may also be used for radar gesture recognition. For example, a radar sensor may be used to determine occupancy of a vehicle, and also to detect gestures from users.

A frequency modulated continuous wave (FMCW) radar system with at least two receive antennas is capable of measuring the range, relative velocity (e.g. Doppler), and angle of objects. The range resolution of a radar system depends on the bandwidth of the signal generated by radar, and increasing range resolution may involve using a local oscillator that supports a larger bandwidth. Increasing the angle resolution of a radar system involves increasing the number of antennas. However, because the velocity resolution of a radar system only depends on the chirp frame length, the velocity resolution may be increased by increasing the chirp frame length.

An embodiment differentiates between various hand gestures, such as a two finger dialing motion and one finger rotational motion, and differentiating clockwise and counter-clockwise motion. An embodiment determines whether a gesture is a clockwise motion or a counter-clockwise motion based on a correlation between the weighted Doppler values and the angle values for FMCW radar frame streams. An embodiment determines whether a gesture is a two finger motion or a one finger motion based on the correlation between a weighted positive Doppler metric and a weighted negative Doppler metric. An embodiment detects gestures, using radar, with a low computational cost. In an embodiment, gestures are detected based on the weighted Doppler metric detected by an FMCW radar system. In another embodiment, gestures are detected based on the weighted Doppler metric and angle metric detection by an FMCW radar system. An embodiment low complexity system detects gestures using FMCW radar.

FIG. 1 illustrates a block diagram for the embodiment frequency modulated continuous wave (FMCW) radar system 112. The FMCW radar system 112 includes the transmit antenna 108 and the receive antennas 110 and 111. The FMCW radar system 112 contains two receive antennas and one transmit antenna. However, some FMCW radar systems may include more receive antennas and/or more transmit antennas. In the FMCW radar system 112, the local oscillator 100 generates frequency ramps, known as chirps, which are transmitted by the transmit antenna 108. The chirps are also provided to the mixers 106 and 107, which are coupled to the local oscillator 100. In an embodiment, the FMCW radar system 112 transmits a 4 GHz bandwidth chirp that ramps from 77 GHz to 81 GHz. Multiple chirps are transmitted sequentially in a frame.

The transmitted radar signals are reflected, and received by the receive antennas 110 and 111. The received radio frequency (RF) signals are mixed with chirps from the local oscillator 100 by the mixer 106 in the receive channel 114 and by the mixer 107 in the receive channel 116, to generate intermediate frequency (IF) signals. IF signals are also known as dechirped signals, beat signals, or raw radar signals. The analog-to-digital converter (ADC) 102 in the receive channel 114 and the ADC 103 in the receive channel 116 digitize the IF signals. The digitized IF signals are sent by the ADCs 102 and 103 to the digital signal processor (DSP) 104 for further processing. The DSP 104 may perform signal processing on the digital IF signals to extract the range and velocity of objects in view of the FMCW radar system 112. Range refers to the distance of an object from the radar sensor and velocity refers to the speed of the object relative to the radar sensor.

Figure 2:
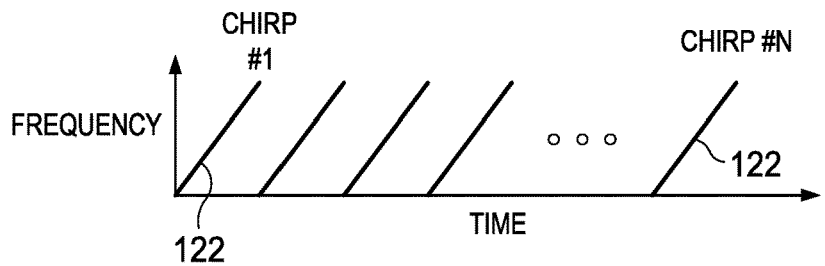
FIG. 2 illustrates embodiment FMCW chirps.

To determine the range, the DSP 104 performs a range Fast Fourier Transform (FFT) on the digital IF signals corresponding to each chirp in a frame of chirps, to convert the data to the frequency domain. For M time samples in a chirp, the DSP computes a range FFT, which yields M range results for the chirp. For N chirps in a frame, an array of N×M range values, the range FFT generates the range-chirp array. The M columns indicate the range values for samples at the same relative time for return across the N chirps. The FIG. 2 illustrates a frame of chirps 122, having N chirps.

The DSP performs a Doppler FFT over the range values of the chirps in the frame, to generate velocity (or Doppler) values or coefficients, and a range-Doppler array that includes the velocity coefficients. That is, the Doppler FFT is performed on each of the M columns of the N×M range-chirp array. The peaks in the N×M range-Doppler array correspond to the range and relative speed or velocity of objects.

Figure 3:
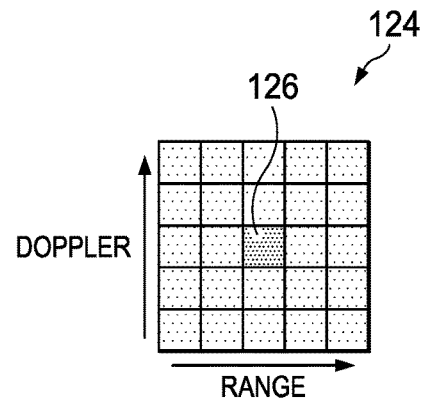
FIG. 3 illustrates an embodiment range-Doppler array.

The range FFT and Doppler FFT may be referred to together as a two dimensional (2D) FFT, and the results of the 2D FFT may be referred to as a range-Doppler plane, range-Doppler slice, or a heat map. FIG. 3 illustrates the range-Doppler array 124, with cell 126. The range-Doppler array 124 denotes a 2D grid with range and velocity on the two axes. The cells in the grid, such as the cell 126, may be referred to as bins. For example, the x-axis may correspond to a set of range bins, and the y-axis may correspond to a set of velocity bins, and each cell may be a bin that corresponds to a combination of a respective range bin and a respective velocity bin. Peaks in the 2D grid indicate objects in the scene. The x and y coordinates indicate the range and velocity of the object (e.g., the range-bin and velocity-bins associated with the object). The DSP or other processor performs an object detection algorithm to detect peaks in the 2D FFT grids (or range-Doppler array) of the two receive antennas. Additionally, the processor may track the detected objects across frames.

Multiple objects with the same range and relative velocity with respect to the radar sensor, but at different angles, may be placed in the same bin in the 2D grid. Two or more receive antennas may be used to discriminate multiple objects in the same bin by determining the angle of the objects. The DSP may generate a 2D FFT grid for each receive antenna, and a third FFT, an angle FFT, is performed across the 2D FFT grids for each receive antenna, to determine the angles for the objects. Accordingly, objects with similar range and velocity but different angles are resolved. The angle may be the azimuth angle and/or the elevation angle, depending on the orientation and shape of the receive antennas. When multiple antennas are used, the range-Doppler arrays for the antennas are averaged (e.g. non-coherently summed) together to increase accuracy.

When detecting a hand that is in close proximity to a radar sensor, the range-Doppler array is diffused. That is, detected objects do not show up as point objects. In an embodiment, one value is extracted from the range-Doppler array, where the value indicates the weighted average of a specific parameter. For example, the value may be the weighted Doppler value, the average range, the Doppler spread, the average angle, the correlation between the range and the Doppler values, the correlation between the angle and the Doppler value, a weighted positive Doppler metric, a weighted negative Doppler metric, correlation between the weighted positive Doppler metric and the weighted negative Doppler metric, and/or other information regarding the Doppler, range, or angle. Accordingly, a single value indicating a particular feature may be determined for each range-Doppler array frame, and a sequence of frames may form a time series for each feature.

Figure 4A:
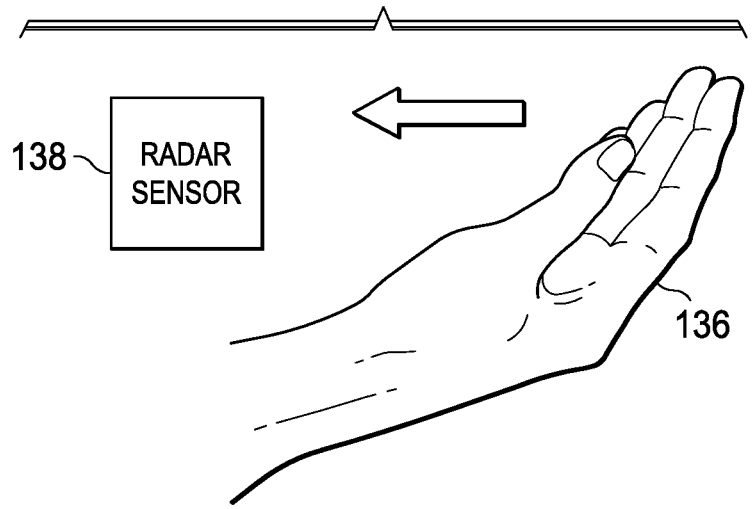
FIGS. 4A-B illustrate an embodiment come gesture.
Figure 4B:
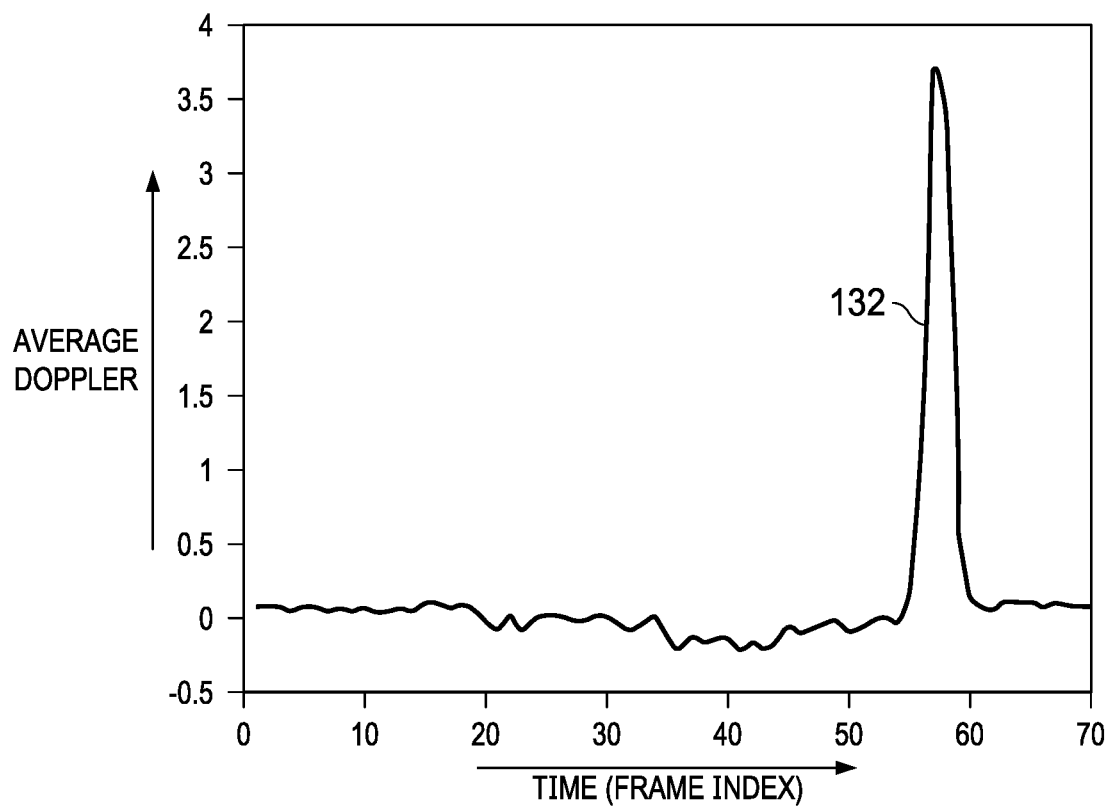

In some examples, come, go, and waving gestures are detected based on the velocity signal of the gesture. FIGS. 4A-B illustrate the detection of a come gesture. FIG. 4A illustrates a come gesture, where the hand 136 moves towards the radar sensor 138. FIG. 4B illustrates the graph 130 illustrating the weighted Doppler metric 132 for a come gesture. The weighted Doppler metric 132 has a positive peak, indicating that the hand is moving towards the radar sensor.

Figure 5A:
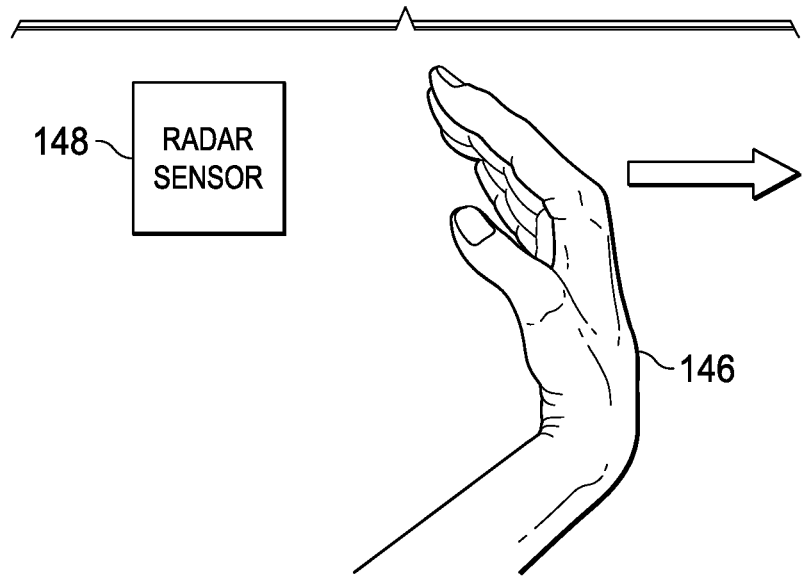
FIGS. 5A-B illustrate an embodiment go gesture.
Figure 5B:
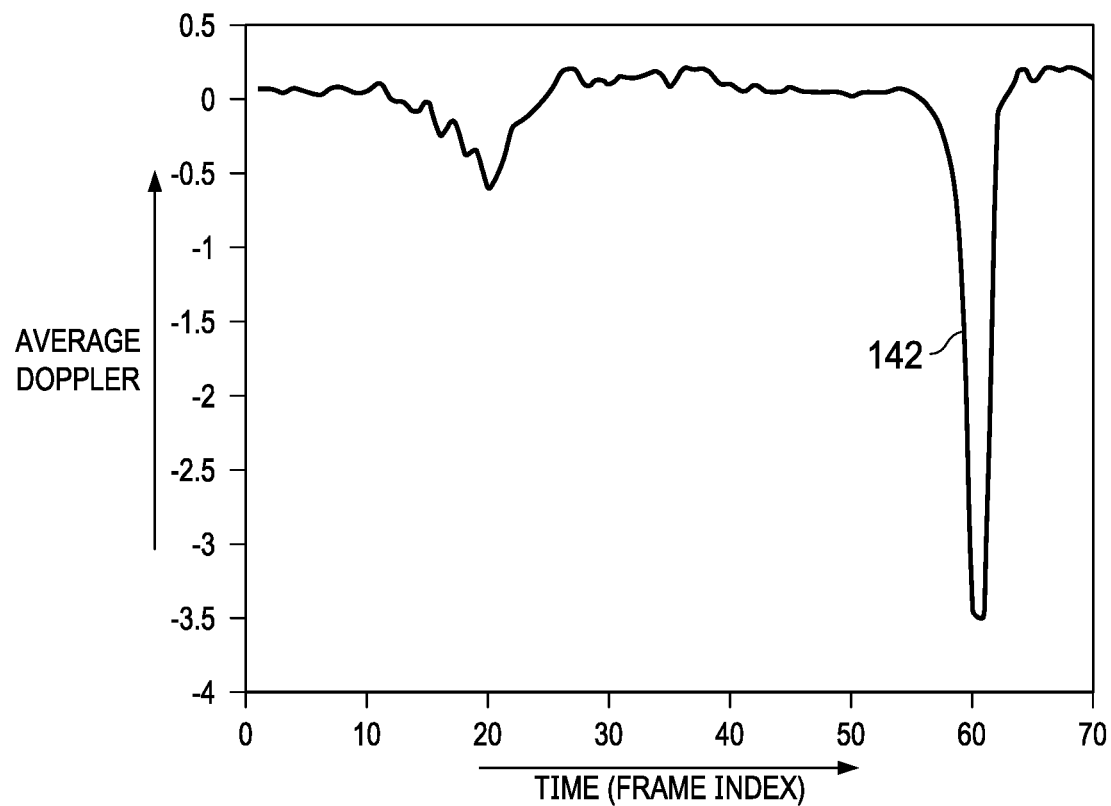

FIGS. 5A-B illustrate the detection of a go gesture. FIG. 5A illustrates a go gesture, where the hand 146 moves away from the radar sensor 148. FIG. 5B illustrates the graph 140 with the weighted Doppler metric 142 for a go gesture. The weighted Doppler metric 142 has a negative peak, indicating that the hand is moving away from the radar sensor.

Figure 6A:
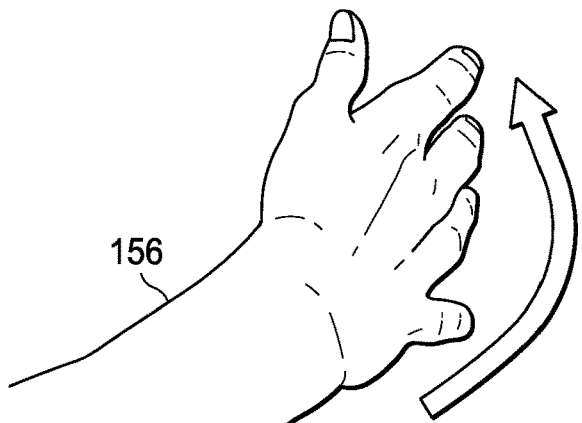
Figure 6B:
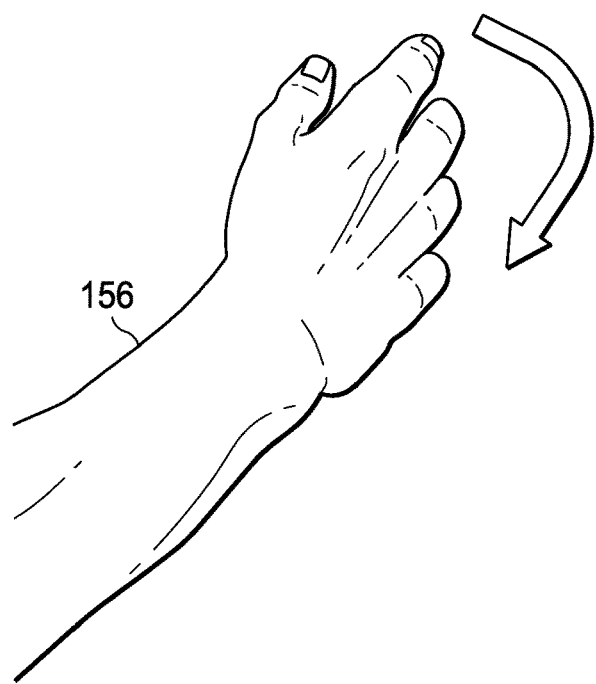

FIGS. 6A-C illustrate the detection of a wave gesture. FIG. 6A-B illustrate a wave gesture, with FIG. 6A illustrating the hand 156 moving towards the radar sensor 158, and FIG. 6B illustrating the hand 156 moving away from the radar sensor 158. FIG. 6C illustrates the graph 150 with the weighted Doppler metric 152, switching transitioning from a negative peak immediately into a positive peak, indicating a wave gesture.

FIG. 7 illustrates the flowchart 300 for an embodiment method of gesture detection. In an embodiment, the method is performed by a processor, for example by a processor on the SoC. The processor may be a DSP or another type of processor, such as a general purpose processor. In the block 302, the processor computes the weighted Doppler metric and the angle metric. The processor computes a 2D FFT for each of the input digital IF signal streams, to generate a range-Doppler array for each of multiple receive antennas. The values of the range-Doppler array are the amplitudes of complex Doppler values. An embodiment has between 2 and 8 receive antennas. To obtain a more accurate range-Doppler array, the processor averages (e.g. non-coherently sums) the range-Doppler arrays for the receive antennas. For example, averaging the range-Doppler arrays may include performing a point-wise average or sum of the range-Doppler arrays, where corresponding elements or bins of the range-Doppler arrays for the different cameras are averaged or summed together to produce an averaged range-Doppler array for the frame. Additionally, the processor computes the angle of the object by computing a third FFT of the range-Doppler arrays over the multiple receive antennas. The processor computes the weighted Doppler metric based on the range-Doppler array averaged over the multiple antennas. Also, the processor computes the angle metric based on the individual values of the range-Doppler arrays averaged over multiple antennas. In an embodiment, the weighted Doppler metric represents the averaged Doppler values of the averaged range-Doppler array, and the angle metric represents the angle value of the gesture in the corresponding frame. Also, the processor computes the weighted positive Doppler metric and the weighted negative Doppler metric. The weighted positive Doppler metric may refer to the Doppler values averaged across the positive Doppler region of the averaged range-Doppler array. Likewise, the weighted negative Doppler metric may refer to the Doppler values averaged across the negative Doppler region of the averaged range-Doppler array. In an embodiment, the positive Doppler region is a region in the 2D-FFT grid (or range-Doppler array) with a positive velocity and the negative Doppler region is a region in the 2D-FFT grid (or range-Doppler array) with a negative velocity. In some examples, the system may determine the weighted Doppler metric (or weighted velocity metric) by using some or all of the technique described below with respect to the block 216 in FIG. 10. In further examples, the system may determine the weighted angle metric by using some or all of the technique described below with respect to the block 218 in FIG. 10. In additional examples, the system may determine the weighted positive Doppler metric and the weighted negative Doppler metric by using some or all of the techniques described below with respect to the blocks 286 and 288, respectively, in FIG. 14.

In the block 304, the processor determines whether a gesture is a two finger motion, with two fingers moving in opposite directions, for example turning a knob, or a one finger gesture, for example one finger rotating. For example, the processor performs a correlation between the weighted positive Doppler metric and the weighted negative Doppler metric, and determines whether the gesture is a two finger motion based on the correlation. In response to determining a relatively high correlation between the weighted positive Doppler metric and the weighted negative Doppler metric (e.g., the correlation is greater than a threshold), the processor may determine that the motion is two fingers moving in opposite directions. On the other hand, in response to determining a relatively low correlation between the weighted positive Doppler metric and the weighted negative Doppler metric (e.g., the correlation is less than a threshold), the processor may determine that the motion is a single finger rotating. In some examples, the processor may use the technique shown in FIG. 14 to make this determination. When the processor determines that the gesture is a two finger motion, it proceeds to the block 306, and when the processor determines that the gesture is a one finger motion, it proceeds to the block 308. In the block 306, the processor determines that the motion is a knob turning motion, with two fingers moving in opposite directions.

In the block 308, the processor determines whether the one-finger motion is a clockwise motion or a counter-clockwise motion. For example, the processor performs a correlation between the weighted Doppler metric and the angle metric, and makes the determination based on the correlation. In response to determining that the correlation between the weighted Doppler metric and the angle metric is positive, the system may determine that the motion is a clockwise motion, and the system proceeds to the block 310. A clockwise one finger motion may indicate, for example, that the user intends to increase the volume. The processor may then send a signal to another device, such as an infotainment system or a mobile device, indicating the clockwise motion. In response to determining that the correlation between the weighted Doppler metric and the angle metric is negative, the system may determine that the motion is a counter-clockwise motion, and the processor proceeds to the block 312. In an embodiment, a counter-clockwise one finger motion indicates that the user intends to decrease the volume. The processor then sends a signal to another system, such as an infotainment system or a mobile device, indicating the counter-clockwise motion. In some examples, the processor may use the technique shown in FIG. 10 to make the determination in block 308.

Figure 8A:
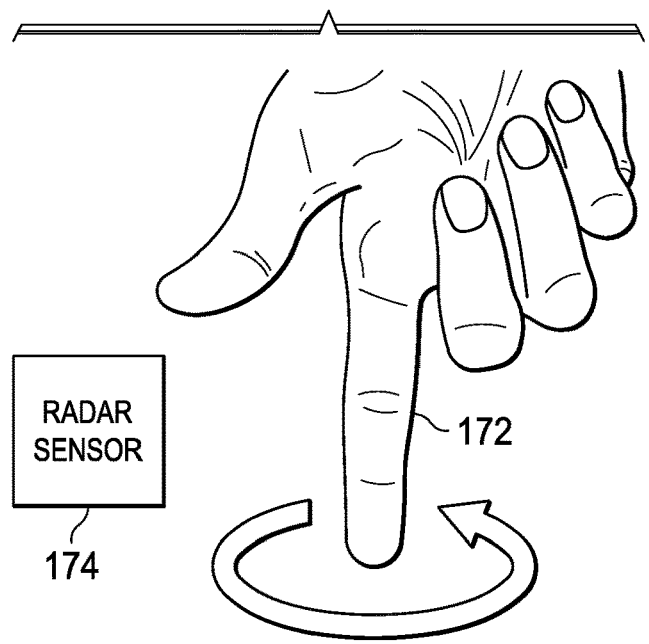
FIGS. 8A-B illustrate an embodiment counter-clockwise gesture.
Figure 8B:
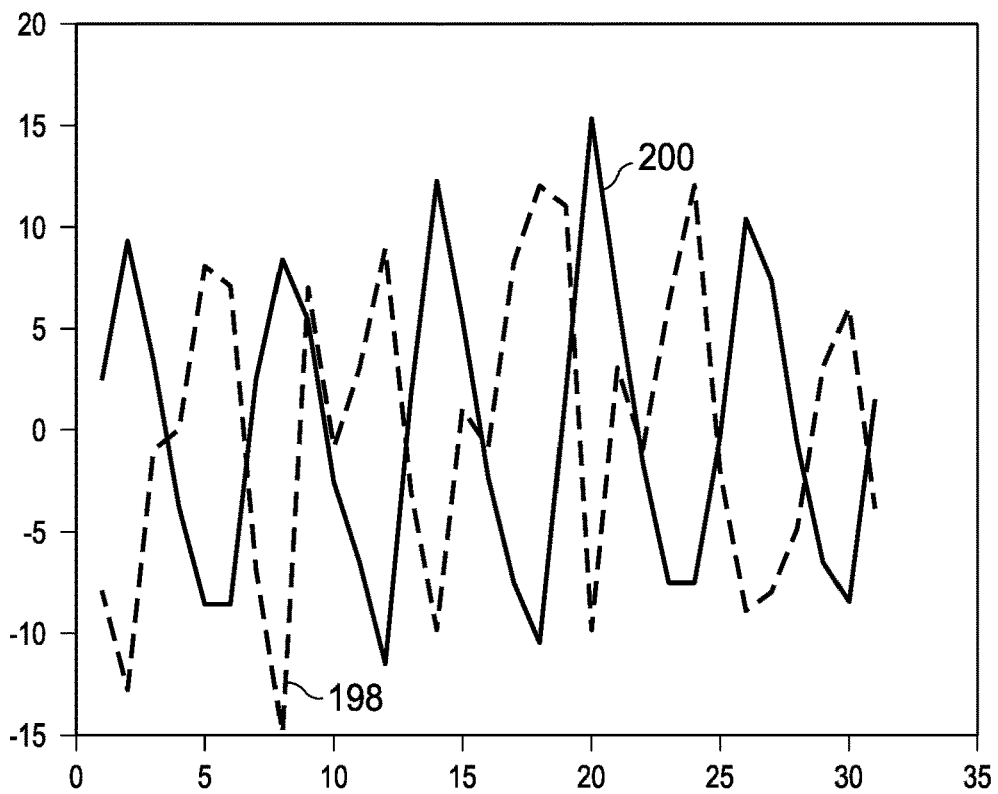

FIGS. 8A-B illustrate the counter-clockwise motion of a finger. FIG. 8A illustrates the finger 172 moving in a counter-clockwise motion, near the radar sensor 174. FIG. 8B illustrates the graph 196, which plots the weighted Doppler metric 200 and the angle metric 198 over time, for counter-clockwise one finger motion. The weighted Doppler metric 200 and the angle metric 198 are out of phase, and have a negative correlation, with the weighted Doppler metric 200 being high when the angle metric 198 is low, and the weighted Doppler metric 200 being low when the angle metric 198 is low.

Figure 9A:
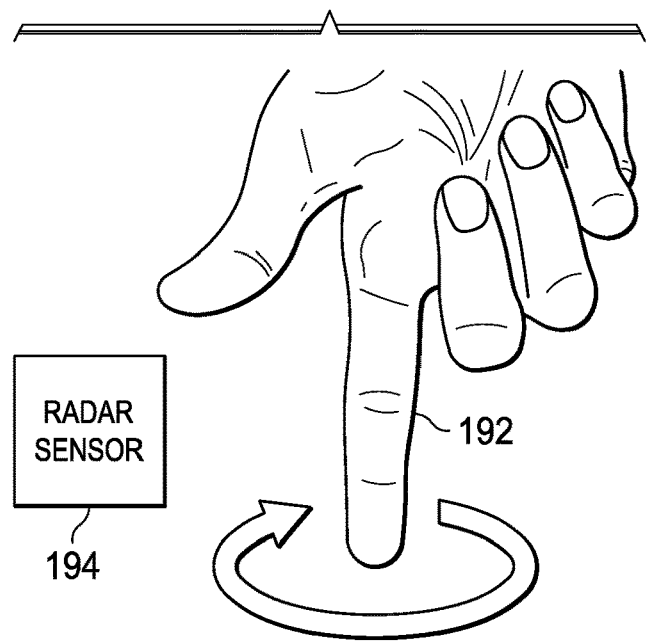
FIGS. 9A-B illustrate an embodiment clockwise gesture.
Figure 9B:
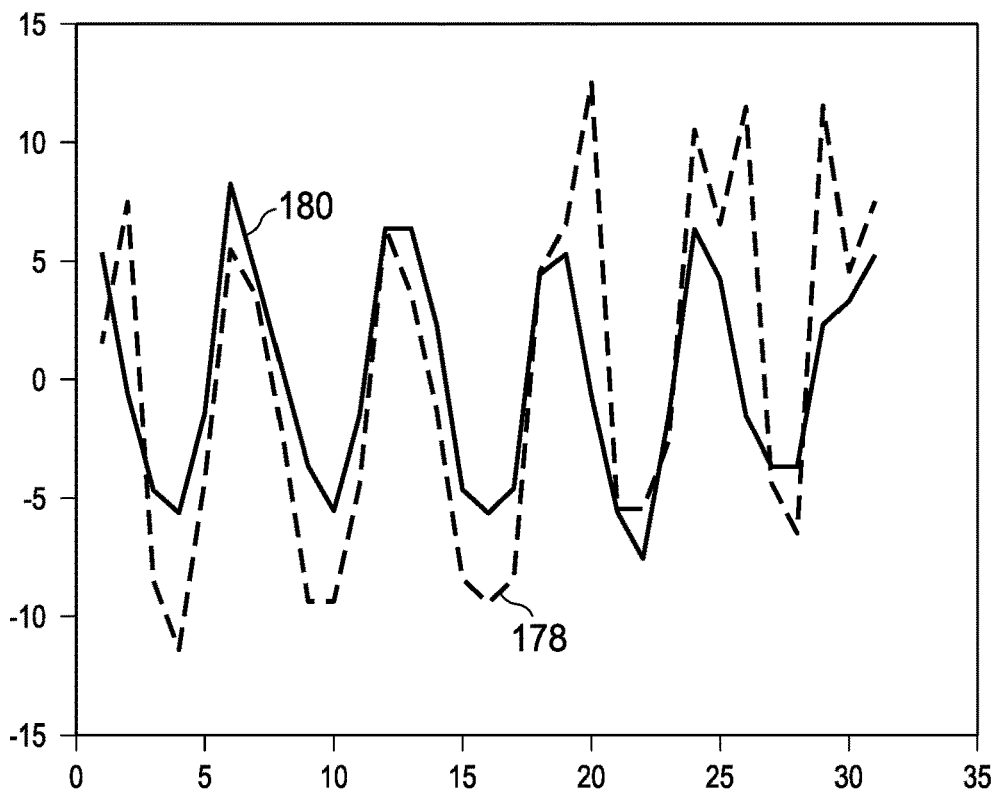

FIGS. 9A-B illustrate the clockwise motion of a finger. FIG. 9A illustrates the finger 192 moving in a clockwise motion, near the radar sensor 194. FIG. 9B illustrates the graph 176, which plots the weighted Doppler metric 180 and the angle metric 178 over time, for clockwise one finger motion. The weighted Doppler metric 180 and the angle metric 178 are in phase, with have a high positive correlation. The weighted Doppler metric 180 and the angle metric 178 are high at the same time, and the weighted Doppler metric 180 and the angle metric 178 are low at the same time.

Figure 10:
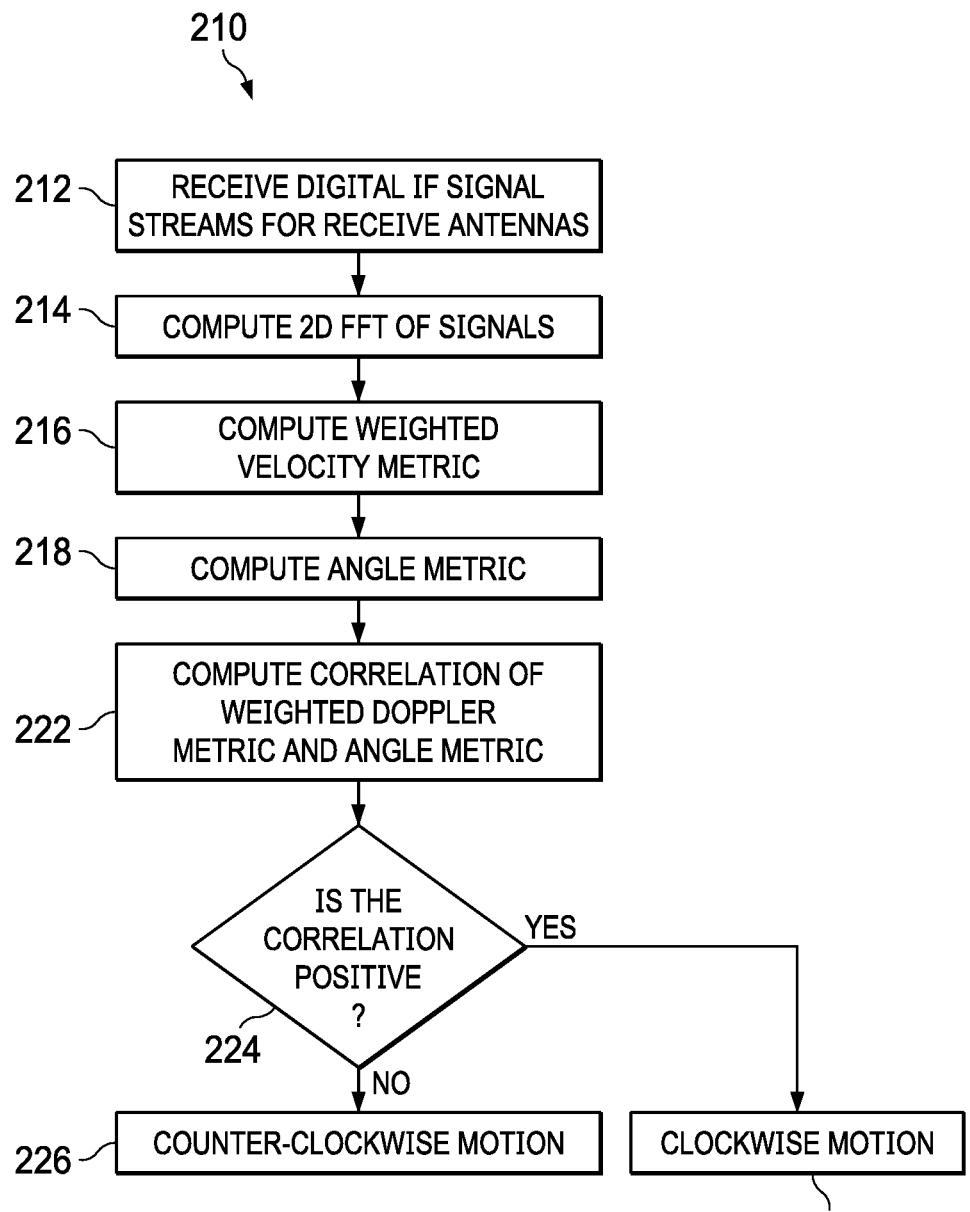
FIG. 10 illustrates a flowchart of an embodiment method of detecting clockwise and counter-clockwise gestures.

FIG. 10 illustrates the flowchart 210 an embodiment method of using FMCW radar to detect clockwise or counter-clockwise rotational motion. The method illustrated by the flowchart 210 may be performed by a processor, such as a DSP or a general purpose processor. In an embodiment the processor is a part of a radar SoC. In the block 212, the processor receives digital IF signal streams for frames of FMCW chirps from multiple receive antennas. The processor may receive between two and eight digital IF signal streams from the receive antennas, with one stream for each receive antenna. In the FMCW system, a transmit antenna transmits a series of FMCW chirps, which are generated by a local oscillator. The number of chirps in a frame, or in the length of the frame, is sufficient for the velocity resolution to recognize gestures. The velocity resolution is given by:

$$\frac{\lambda}{2T_c N_f},$$

where $N_f$ is the number of chirps in a frame, $T_c$ is the chirp periodicity, and $\lambda$ is the wavelength of the radar. For a 77 GHz radar system, where $\lambda$ is about 3.8 mm, and a $T_c$ of 125 µs, an $N_f$ of 256 yields a velocity resolution of 0.06 ms, which is sufficient to recognize gestures in some embodiments. At least two receive antennas receive reflections of the chirps. Corresponding mixers then mix the received signals with the transmitted chirps, to obtain analog IF signal streams. Corresponding ADC converters convert the analog IF signal streams from the analog domain to the digital domain, to generate digital IF signal streams. The processor receives these digital IF signal streams.

In the block 214, the processor computes the 2D FFT of the digital IF signal streams received in the block 212. The processor performs a range FFT on the digital IF signal stream of frames of chirps for the digital IF signal streams from the multiple antennas, to convert the data to the frequency domain. In an embodiment, the number of range samples for a chirp for each antenna is equal to the number of time samples for the chirp received by the antennas. Also, the processor performs the Doppler FFT over each of the corresponding range values of the chirps in a frame for each receive antenna. That is, the Doppler FFT is performed on each column in the range-chirp array. Accordingly, a range-Doppler array is produced for each receive antenna, with the resulting peaks in the range-Doppler array corresponding to the range and relative velocity of objects in the field of view of the radar sensor. Then, the processor averages the amplitudes of the bins of the range-Doppler arrays for the multiple antennas to create an averaged range-Doppler heat map. This heat map is denoted by $F(.,.)$, and $F(i_r, i_v)$ refers to the magnitude of the heat map at the bin corresponding to the range index $i_r$ and the Doppler index $i_v$.

In the block 216, the processor computes the weighted Doppler metric for the range-Doppler arrays. In an embodiment, the processor computes the weighted Doppler metric over a set of ranges of an estimated location of the gesture. The estimated location of the gesture may be at a range in which it is likely that a user's hand is located. In one embodiment the weighted Doppler metric is computed as:

$$D = \frac{\sum_{i_r \in [r_{min}, r_{max}], i_v \in [-v_{max}, v_{max}]} i_v F(i_r, i_v)}{\sum_{i_r \in [r_{min}, r_{max}], i_v \in [-v_{max}, v_{max}]} F(i_r, i_v)},$$

where $r_{min}$ and $r_{max}$ are the minimum and maximum ranges, respectively, where the gesture is expected to occur, $-v_{min}$ and $v_{max}$ are the maximum negative Doppler and maximum positive Doppler, respectively, where the gesture is expected. In other embodiments, alternative methods of computing weighted Doppler are used. For example, the weighted Doppler metric may use the logarithm of the heat map:

$$D = \frac{\sum_{i_r \in [r_{min}, r_{max}], i_v \in [-v_{max}, v_{max}]} i_v \log 10(F(i_r, i_v))}{\sum_{i_r \in [r_{min}, r_{max}], i_v \in [-v_{max}, v_{max}]} F(i_r, i_v)}.$$

The weighted Doppler metric D is calculated for every frame, creating a weighted Doppler metric sequence (denoted by D(t)), which captures the time evolution of the weighted Doppler metric.

In the block 218, the processor computes the angle metric. In some embodiments, the block 218 is performed before the block 216. In other embodiments, the block 218 is performed after the block 216, or at the same time as the block 216. The processor performs an FFT across the range-Doppler arrays for the multiple antennas. The angle may be either the azimuth angle and/or the elevation angle, depending on the orientation and shape of the receive antenna array. The angle metric quantifies the angle content of gesture in the frame. In some embodiments, the angle metric is computed by the processor, by identifying the range index $i_{r\_max}$ and the Doppler index $i_{v\_max}$ of the bin corresponding to the maximum amplitude of all the bins in the range-Doppler heat map that lie in the region bounded by the range indices of the minimum range $r_{min}$ and the maximum range $r_{max}$ and the velocity indices between the minimum $-v_{max}$ and maximum $v_{max}$:

$$(i_{r\_max}, i_{v\_max}) = \mathrm{argmax}_{i_r \in [r_{min}, r_{max}], i_v \in [-v_{max}, v_{max}]} F(i_r, i_v).$$

The angle metric $\theta$ is then computed using the bin ($i_{r\_max}$, $i_{v\_max}$) across the range-Doppler arrays for multiple antennas. The value $F(i_r, i_v)$ is the average amplitude of the signals in corresponding bins with range index $i_r$ and velocity index $i_v$. In one embodiment, the angles across multiple antennas are determined by computing an FFT across corresponding bin values (e.g. bins with range index $i_{r\_max}$ and Doppler index $i_{v\_max}$) in consecutive antennas, known as receiver beamforming or the 3$^{rd}$ dimension FFT. The angle $\theta(i_v)$ across corresponding bins in the grids is computed for each maximum amplitude. In another embodiment, multiple signal classification (MUSIC) is used. In additional embodiments, different methods of determining angles are used.

The angle metric is calculated for every frame, creating an angle metric sequence $\theta(t)$, which captures the time evolution of the weighted angle, where t is per frame.

In the block 222, the processor computes the correlation between the weighted Doppler metric D(t) and the angle metric $\theta(t)$, where t is time in units of the frame index. The correlation is given by:

$$C(k) = \Sigma_{t=k-T}^{t=k} D(t) * [\theta(t) - \theta_m],$$

where:

$$\theta_m = \Sigma_{t=k-T}^{t=k} \theta(t).$$

In these equations, t is time or the frame index, the time t for the correlation ranges from k–T to k, where T is the size of the correlation window and k is the time position or the frame index.

In the block 224, the processor determines whether the correlation is positive or negative. When the correlation is positive, the processor proceeds to the block 228, and determines that the gesture is a clockwise motion. The processor may send a signal to control another system or subsystem, for example to an infotainment system requesting that the infotainment system increase the volume. On the other hand, when the correlation is negative, the processor proceeds to the block 226, and determines that the gesture is counter-clockwise motion. The processor may send a signal to control another system or subsystem, for example to an infotainment system, requesting that the infotainment system decrease the volume.

In some embodiments, the processor separates out high positive correlations, high negative correlations, and low correlations. The processor may determine that a high positive correlation indicates a clockwise motion, a high negative correlation indicates a counter-clockwise motion, and a low correlation indicates neither a clockwise motion nor a counter-clockwise motion. In some embodiments, the processor sends the correlation sequence C(k) to a machine learning algorithm, such as an artificial neural network, decision tree learning, or a support vector machine (SVM), which detects and classifies the gesture.

Figure 11A:
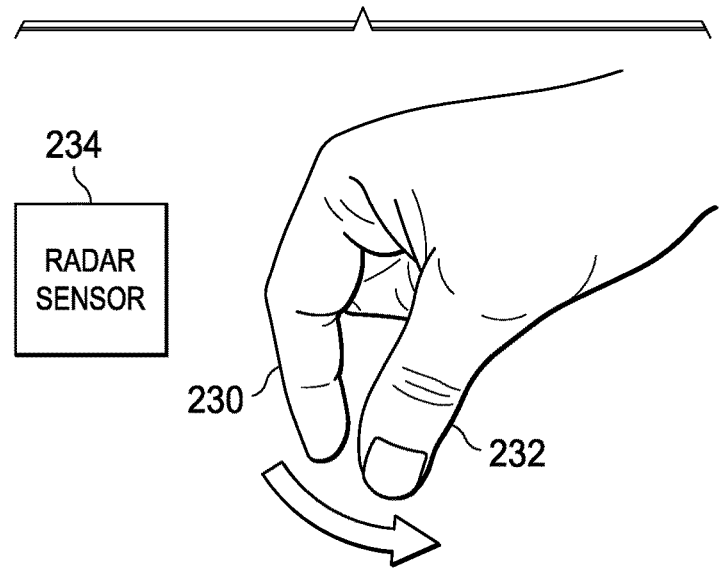
FIGS. 11A-B illustrate an embodiment two finger dialing gesture.
Figure 11B:
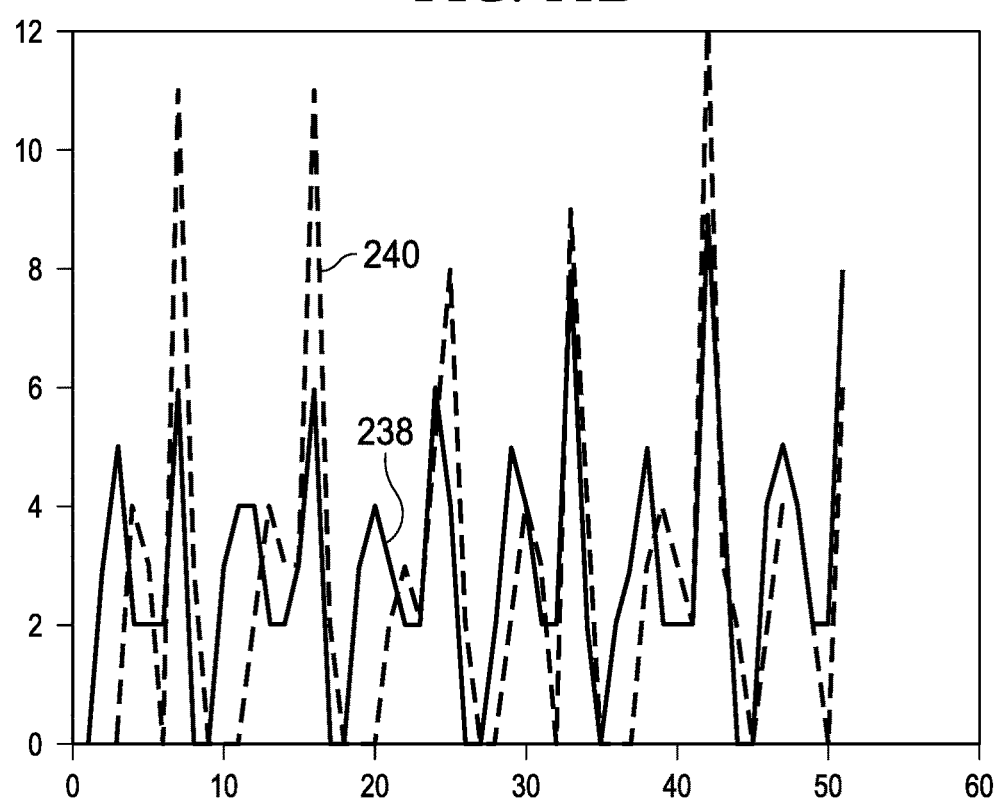

FIGS. 11A-B illustrate a two finger rotational motion, for example with the fingers turning a physical dial. FIG. 11A illustrates the finger 230 and the finger 232 rotating, near the radar sensor 234. FIG. 11B illustrates the graph 236, which plots the weighted positive Doppler metric 238 and the weighted negative Doppler metric 240 over time for a two finger rotational motion. The weighted positive Doppler metric 238 and the weighed negative Doppler metric 240 for the two finger rotating, dialing, or fine tuning motion are positively correlated, with both the weighted positive Doppler metric 238 and the weighted negative Doppler metric 240 being high together and being low together.

Figure 12:
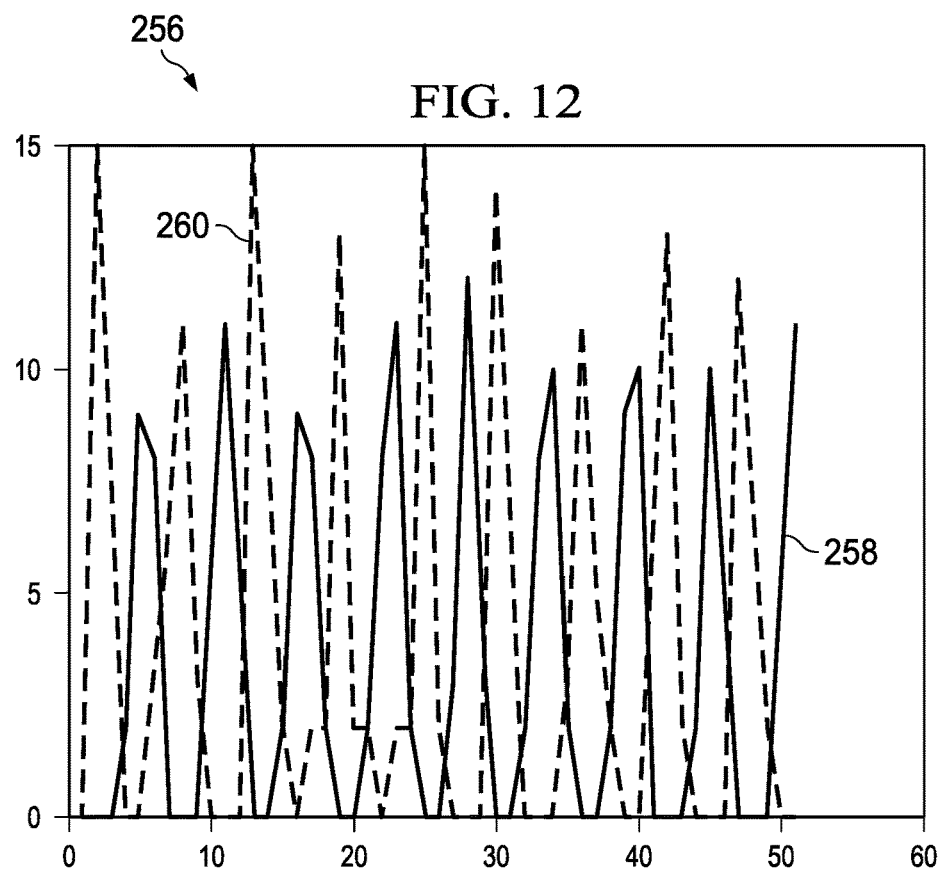
FIG. 12 illustrates a graph a weighted positive Doppler metric and a weighted negative Doppler metric for an embodiment one finger rotational gesture.

FIG. 8A illustrates the finger 172 rotating near the radar sensor 174. FIG. 12 illustrates the graph 256 for the weighted positive Doppler metric 258 and the weighted negative Doppler metric 260 over time for a one finger rotational motion. The weighted positive Doppler metric and the weighted negative Doppler metric 260 have a low correlation.

Figure 13:
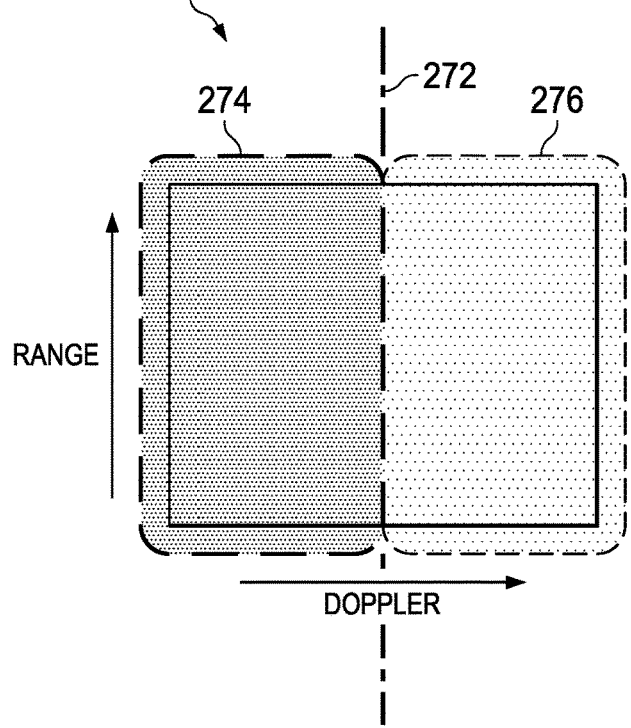
FIG. 13 illustrates embodiment Doppler regions.

FIG. 13 illustrates the graph 270, illustrating the positive Doppler region 276 and the negative Doppler region 274 in a range-Doppler plane, which may correspond to a range-Doppler heat map. Doppler values below (or to the left of) the dividing line 272 are in the negative Doppler region 274, and Doppler values above (or to the right of) the dividing line 272 are in the positive Doppler region 276. In some examples, dividing line 272 may correspond to a zero velocity, and values to the right of the dividing line 272 may correspond to positive Doppler values, and values to the left of the dividing line 272 may correspond to negative Doppler values. In an embodiment, the weighted negative Doppler metric $D_-(t)$ may correspond to the Doppler values of the range-Doppler heat map averaged over the negative Doppler region 274, and the weighted positive Doppler metric $D_+(t)$ may correspond to the Doppler values of the range-Doppler heat map averaged over the positive Doppler region 276.

In some embodiments, different Doppler regions are used. The range-Doppler heat map may be divided into three, four, or more regions. For example, the Doppler plot may be divided into high negative Doppler region, high positive Doppler region, and moderate Doppler region.

Figure 14:
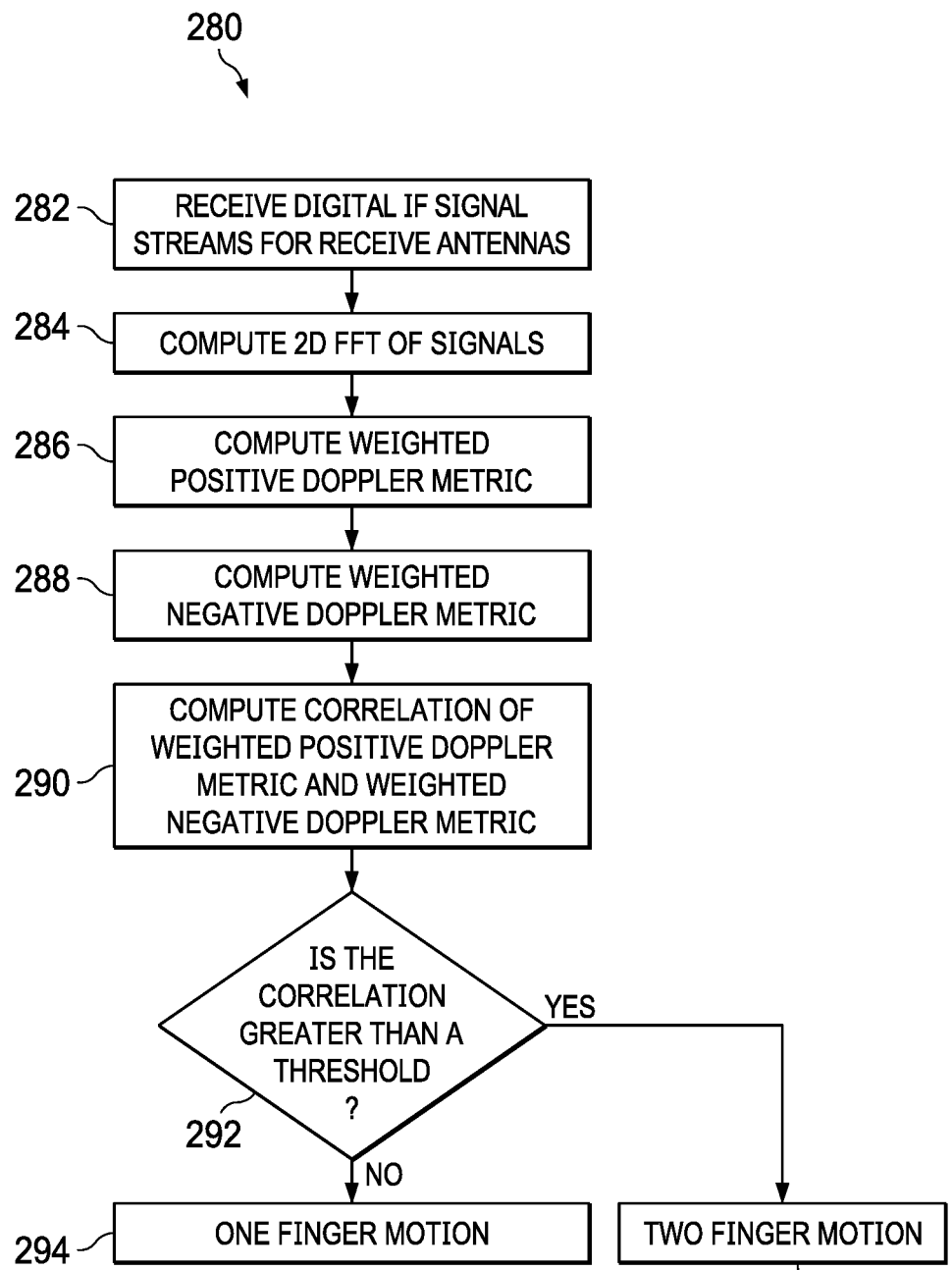
FIG. 14 illustrates a flowchart of an embodiment method of detecting one finger and two finger motion.

FIG. 14 illustrates the flowchart 280 for an embodiment method of detection one finger and two finger rotational gestures. In an embodiment, the method illustrated by the flowchart 280 is performed by a processor, for example a DSP or a general purpose processor, that may be a part of an SoC. The processor, in the block 282, receives digital IF signal streams for frames of chirps from multiple antennas. The transmit antenna(s) of the FMCW system transmits a series of chirps, which are generated by a local oscillator. Reflections of the chirps are received by one or more receive antennas. In an embodiment, between two and eight receive antennas are uses. Mixers of the FMCW radar system mix the received signal streams with the transmitted chirps from the local oscillator, to obtain analog IF signal streams. Also, ADCs convert the analog IF signal streams from the analog domain to the digital domain as the digital IF signal streams.

In the block 284, the processor computes the 2D FFT of the digital IF signal streams received in the block 282. The processor performs a range FFT on each digital IF signal stream of a frame of chirps for each receive antenna, to convert the data to the frequency domain. Also, the processor performs the Doppler FFT over each of the corresponding range values of the chips in a frame. The resulting peaks in the range-Doppler arrays correspond to the range and relative velocity of objects, where peaks in the range-Doppler array indicate objects. Also, the processor averages the range-Doppler arrays over the multiple antennas, to produce a range-Doppler heat map.

In the block 286, the processor computes the weighted positive Doppler metric. The processor averages the Doppler value over the positive Doppler region of the range-Doppler heat map, to yield the weighted positive Doppler metric $D_+(t)$. In an embodiment, the weighted positive Doppler metric is computed over a set of ranges of the estimated location of the gesture and over the positive velocities up to a maximum velocity $v_{max}$.

In one embodiment the weighted positive Doppler metric is computed as:

$$\frac{\Sigma_{i_r \in [r_{min}, r_{max}], i_v \in [0, v_{max}]} i_v F(i_r, i_v)}{\Sigma_{i_r \in [r_{min}, r_{max}], i_v \in [0, v_{max}]} F(i_r, i_v)}.$$

In the above equation $r_{min}$ and $r_{max}$ refer to minimum and maximum ranges between which the gesture is expected to occur. Likewise, $v_{max}$ refers to the maximum expected positive Doppler content of a gesture. This heat map is denoted by $F(.,.)$, and $F(i_r, i_v)$ refers to the magnitude of the heat map at the bin corresponding to the range index $i_r$ and the Doppler index $i_v$. In other embodiments, alternative methods of computing the weighted positive Doppler metric are used. For example, the weighted positive Doppler metric can use the logarithm of the heat map:

$$D_+ = \frac{\Sigma_{i_r \in [r_{min}, r_{max}], i_v \in [0, v_{max}]} i_v \log10(F(i_r, i_v))}{\Sigma_{i_r \in [r_{min}, r_{max}], i_v \in [0, v_{max}]} F(i_r, i_v)}.$$

The weighted positive Doppler metric is calculated for every frame, creating a sequence $D_+(t)$ which captures the time evolution of the weighted positive Doppler metric.

In the block 288, the processor computes the weighted negative Doppler metric D−(t). The block 288 may be performed before the block 286, after the block 286, or at the same time as the block 286. The processor averages the Doppler values over the negative Doppler region of the range-Doppler heat map, to yield D−(t). In an embodiment, the weighted negative Doppler value is computed over a set of ranges of the estimated location of the gesture and over the negative velocities up to a maximum negative velocity of $-v_{max}$.

In one embodiment the weighted negative Doppler metric is computed as:

$$D_- = \frac{\Sigma_{i_r \in [r_{min}, r_{max}], i_v \in [-v_{max}, 0]} i_v F(i_r, i_v)}{\Sigma_{i_r \in [r_{min}, r_{max}], i_v \in [-v_{max}, 0]} F(i_r, i_v)}.$$

In the above equation $r_{min}$ and $r_{max}$ refer to minimum and maximum ranges between which the gesture is expected to occur. Likewise, $-v_{max}$ refers to the maximum expected negative Doppler content of a gesture. In other embodiments, alternative methods of computing the weighted negative Doppler metric are used. For e.g., the weighted negative Doppler metric can use the logarithm of the heat map:

$$D_- = \frac{\Sigma_{i_r \in [r_{min}, r_{max}], i_v \in [-v_{max}, 0]} i_v \log10(F(i_r, i_v))}{\Sigma_{i_r \in [r_{min}, r_{max}], i_v \in [-v_{max}, 0]} F(i_r, i_v)}.$$

The weighted negative Doppler metric is calculated for every frame, creating a sequence D(t) which captures the time evolution of the weighted negative Doppler.

In the block 290, the processor computes the correlation between the weighted positive Doppler metric $D_+(t)$ and the weighted negative Doppler metric $D_-(t)$. The correlation is given by:

$$C(t) = \Sigma_{t=k-T}^{t=k} D_+(t) * D_-(t),$$

where t is time, T indicates the correlation window, and k indicates the time position.

In the block 292, the processor determines whether the correlation is greater than a threshold, for example a predetermined threshold, which may be determined empirically. When the correlation is greater than the threshold, the processor proceeds to the block 296, and determines that the motion is a two finger motion. On the other hand, when the correlation is less than or equal to the threshold, the processor proceeds to the block 294, and determines that the motion is a one finger motion. The processor may perform additional monitoring and computation, for example to determine whether the motion is clockwise or counterclockwise.

In one embodiment, two thresholds, a lower threshold and an upper threshold are used. When the correlation is greater than the upper threshold, the motion is determined to be a two finger motion, when the correlation is below the lower threshold, the motion is determined to be a one finger motion, and when the correlation is between the upper threshold and the lower threshold, the motion is determined to be neither a one finger motion nor a two finger motion, or to be an undetermined motion. In some embodiments, the processor sends the correlation sequence C(k) to a machine learning algorithm, such as an artificial neural network, which would detect and classify the gesture.

Figure 15:
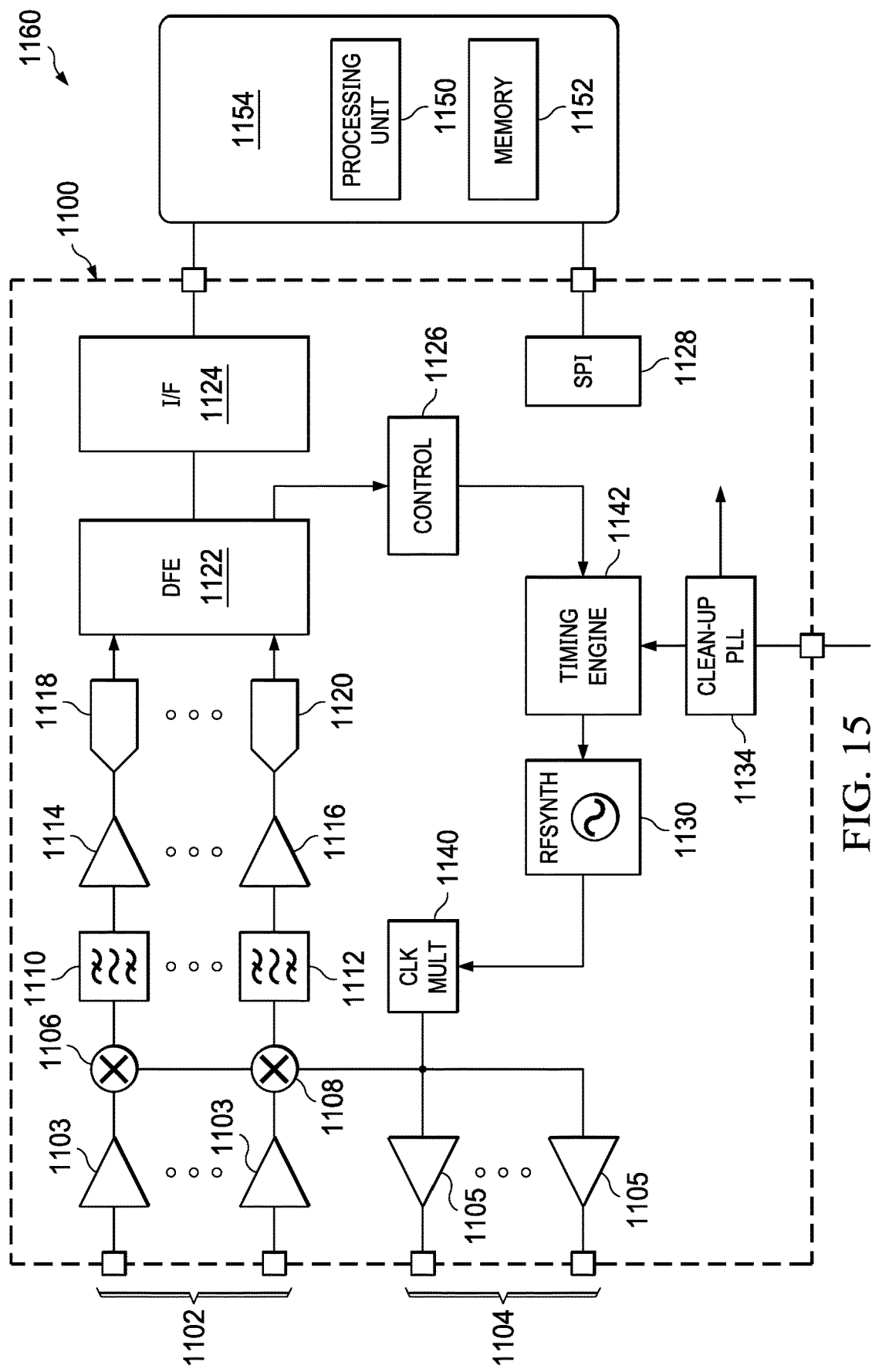
FIG. 15 illustrates an embodiment radar system-on-a-chip (SoC).

FIG. 15 illustrates the block diagram for an embodiment FMCW radar system 1160 for gesture recognition. In some embodiments, the processing unit and the memory are within the SoC. The FMCW radar system 1160 includes a processing unit 1150 and an FMCW radar system on a chip (SoC) 1100. In an embodiment, the radar SoC 1100 is a radar chip, such as AWR14xx™ or AWR16xx™. The radar SoC 1100 may include multiple transmit channels 1104 for transmitting FMCW signals and multiple receive channels 1102 for receiving reflected signals. Additionally, the number of receive channels may be larger than the number of transmit channels. For example, the radar SoC 1100 may have two transmit channels and four receive channels. A transmit channels 1104 include transmitters and antennas (not pictured). The transmit channels 1104 also include the amplifiers 1105.

The receive channels 1102 include receivers and antennas (not pictured). The receive channels 1102 also include the amplifiers 1103. Additionally, the receive channels 1102 include the mixers 1106 and 1108 for mixing the transmitted signal, known as the chirp signal, with the received signal, to generate the IF signal. The IF signal is also known as the beat signal, the dechirped signal, or the raw radar signal. The receive channels 1102 also include the baseband bandpass filters 1110 and 1112 for filtering the IF signal, the variable gain amplifiers (VGAs) 1114 and 1116 for amplifying the filtered IF signal, and the analog-to-digital converters (ADCs) 1118 and 1120 for converting the filtered signal to a digital IF signal.

The receive channels 1102 are coupled to the digital front end (DFE) 1122, which performs decimation filtering on the digital signal, to reduce the sampling rate and bring the signal back to baseband. The DFE 1122 may also perform other operations on the digital signals, for example DC offset removal. The DFE 1122 is coupled to the high speed interface component 1124 to transfer the output of the DFE 1122 to the computing device 1154.

The computing device 1154 includes the processing unit 1150 and the memory 1152. The processing unit 1150 performs gesture recognition on the digital IF signals. The processing unit 1150 may include any processor or combination of processors. For example, the processing unit 1150 may be a DSP, a multipoint control unit (MCU), an FFT engine, a DSP and MCU processor, a field programmable gate array (FPGA), an application specific integrated circuit (ASIC), or a general purpose processor. The memory 1152 provides storage, for example a non-transitory computer readable medium, which may be used to store programming instructions for execution by the processing unit 1150. The memory 1152 may be a volatile memory, such as random access memory, a non-volatile memory, such as a hard disk drive, a solid state drive, or flash memory, or a combination thereof. In an embodiment, the memory 1152 is also used to store data obtained during the gesture recognition.

The control component 1126, coupled to the DFE 1122, controls the operation of the radar SoC 1100. The control component 1126 may include a processor, such as an MCU that executes programming instructions to operate the radar SoC 1100.

The serial peripheral interface (SPI) 1128, coupled to the computing device 1154, provides an interface for communication with the computing device 1154. For example, the processing unit 1150 of the computing device 1154 may send control information, for example the timing and frequencies of chirps, output power level, triggering of monitoring functions, and other instructions, to the radar SoC 1100.

The timing engine 1142 is coupled to the control component 1126. The timing engine 1142 receives chirp parameter values for a sequence of chirps in a radar frame from the control component 1126. Then, the timing engine 1142 generates chirp control signals that control the transmission and reception of the chirps in a frame based on the parameter values. The radio frequency synthesizer (RFSYNTH) 1130 generates signals for transmission based on the chirp control signals from the timing engine 1142. In some embodiments, the RFSYNTH 1130 includes a PLL with a voltage control oscillator (VCO). The timing engine 1142 may be coupled to the clean-up phase locked loop (PLL) 1134. The clean-up PLL increases the frequency of the signal of an external low frequency clock (not shown) to the frequency of the RFSYNTH 1130. The clean-up PLL also filters the reference clock phase noise out of the clock signal.

The clock multiplier 1140 increases the frequency of the transmission signal from the RFSYNTH 1130 to the frequency of the mixers 1106 and 1108. The output of the clock multiplier 1140 is then used for the transmit channels 1104.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A method for gesture recognition, the method comprising:
   receiving, by a processor, a first digital intermediate frequency (IF) signal stream from a first receive antenna;
   receiving, by the processor, a second digital IF signal stream from a second receive antenna;
   computing, by the processor, a weighted Doppler metric stream based on the first digital IF signal stream and the second digital IF signal stream;
   computing, by the processor, an angle metric stream based on the first digital IF signal stream and the second digital IF signal stream;
   computing, by the processor, a first correlation value that includes a product of the weighted Doppler metric stream and the angle metric stream over a window; and
   recognizing, by the processor, a gesture, based on the first correlation value.

2. The method of claim 1, further comprising:
   computing a weighted positive Doppler metric stream based on the first digital IF signal stream and the second digital IF signal stream;
   computing a weighted negative Doppler metric stream based on the first digital IF signal stream and the second digital IF signal stream; and
   computing a second correlation value that includes a product of the weighted positive Doppler metric stream and the weighted negative Doppler metric stream; and
   wherein recognizing the gesture is further performed based on the second correlation value.

3. The method of claim 2, wherein recognizing the gesture comprises determining whether the gesture is a two finger motion, a clockwise one finger motion, or a counter-clockwise one finger motion.

4. The method of claim 1, wherein computing the weighted Doppler metric stream comprises:
   performing a two-dimensional (2D) fast Fourier transform (FFT) on the first digital IF signal stream, to generate a first range-Doppler array;
   performing a 2D FFT on the second digital IF signal stream, to generate a second range-Doppler array;
   averaging the first range-Doppler array and the second range-Doppler array, to generate a third range-Doppler array; and
   generating the weighted Doppler metric stream based on the third range-Doppler array.

5. The method of claim 4, wherein performing the 2D FFT on the first digital IF signal stream comprises:
   performing a range FFT on a frame of chirps of the first digital IF signal stream; and
   performing a Doppler FFT over multiple chirps of the frame of chirps of the first digital IF signal stream.

6. The method of claim 1, wherein recognizing the gesture comprises determining whether the gesture is a clockwise motion or a counter-clockwise motion.

7. The method of claim 6, further comprising:
   increasing a volume of an audio system in response to determining that the gesture is the clockwise motion; and
   decreasing the volume of the audio system in response to determining that the gesture is the counter-clockwise motion.

8. The method of claim 6, further comprising:
   determining that the gesture is the clockwise motion in response to determining that the first correlation value is positive; and determining that the gesture is the counter-clockwise motion in response to determining that the first correlation value is negative.

9. A method for gesture recognition, the method comprising:
receiving, by a processor, a digital intermediate frequency (IF) signal stream from a receive antenna;
computing, by the processor, a weighted positive Doppler metric stream based on the digital IF signal stream;
computing, by the processor, a weighted negative Doppler metric stream based on the digital IF signal stream;
computing, by the processor, a correlation value that includes a product of the weighted positive Doppler metric stream and the weighted negative Doppler metric stream over a correlation window; and
recognizing, by the processor, a gesture, based on the correlation value.

10. The method of claim 9, wherein recognizing the gesture comprises determining whether the gesture is a one finger motion or a two finger motion.

11. The method of claim 10, further comprising determining whether the gesture is a clockwise motion or a counter-clockwise motion in response to determining that the gesture is the one finger motion.

12. The method of claim 10, wherein determining whether the gesture is the one finger motion or the two finger motion comprises:
determining that the gesture is the one finger motion in response to determining that the correlation value is less than or equal to a threshold; and
determining that the gesture is the two finger motion in response to determining that the correlation value is greater than the threshold.

13. The method of claim 9, wherein computing the weighted positive Doppler metric stream comprises computing weighted velocity over a positive Doppler region.

14. The method of claim 9, wherein computing the weighted negative Doppler metric stream comprises computing weighted velocity over a negative Doppler region.

15. A frequency modulated continuous wave (FMCW) radar system, comprising:
a first receive antenna configured to receive a first received signal;
a first receive channel coupled to the first receive antenna, the first receive channel configured to generate a first digital intermediate frequency (IF) signal based on the first received signal;
a second receive antenna configured to receive a second received signal;
a second receive channel coupled to the first receive antenna, the second receive channel configured to generate a second digital IF signal based on the second received signal; and
a processor coupled to the first receive channel and to the second receive channel, the processor configured to:
compute a weighted Doppler metric stream based on the first digital IF signal stream and the second IF digital signal stream;
compute an angle metric stream based on the first digital IF signal stream and the second digital IF signal stream;
compute a correlation value that includes a product of the weighted Doppler metric stream and the angle metric stream; and
recognize a gesture based on the correlation value.

16. The FMCW radar system of claim 15, further comprising:
a local oscillator configured to generate an FMCW chirp; and
a transmit antenna configured to transmit the FMCW chirp; and
wherein the first receive channel comprises:
a mixer coupled to the first receive antenna and to the local oscillator, the mixer configured to mix the FMCW chirp and the first received signal, to generate an analog IF signal; and
an analog-to-digital converter (ADC) coupled to the mixer and to the processor, the ADC configured to generate the first digital IF signal based on the analog IF signal.

17. The FMCW radar system of claim 15, wherein:
the correlation value is a first correlation value;
the processor is further configured to:
compute a weighted positive Doppler metric stream based on the first digital IF signal stream and the second digital IF signal stream;
compute a weighted negative Doppler metric stream based on the first digital IF signal stream and the second digital IF signal stream; and
compute a second correlation value that includes a product of the weighted positive Doppler metric stream and the weighted negative Doppler metric stream; and
recognizing the gesture is further performed based on the second correlation value.

18. The FMCW radar system of claim 17, wherein recognizing the gesture comprises determining whether the gesture is a two finger motion or a one finger motion.

19. The FMCW radar system of claim 15, wherein recognizing the gesture comprises determining whether the gesture is a clockwise motion or a counter-clockwise motion.

20. The FMCW radar system of claim 15, wherein the FMCW radar system is a system-on-a-chip (SoC).

* * * * *